May 12, 1959     J. D. WORMLEY ET AL     2,885,900
FORWARD-REVERSE TRANSMISSION
Filed Oct. 15, 1956     3 Sheets-Sheet 1
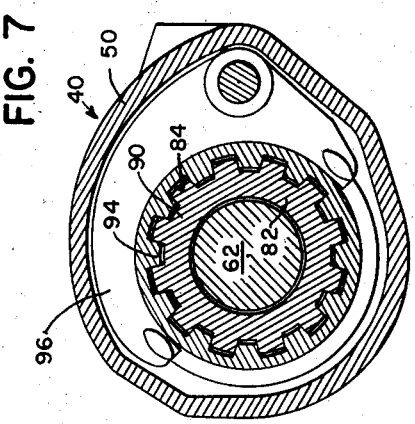
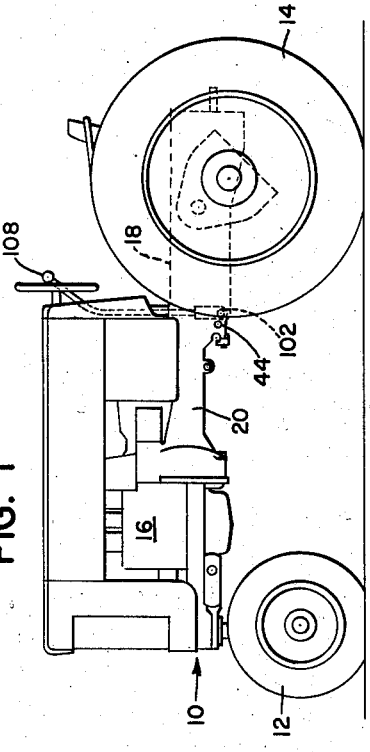
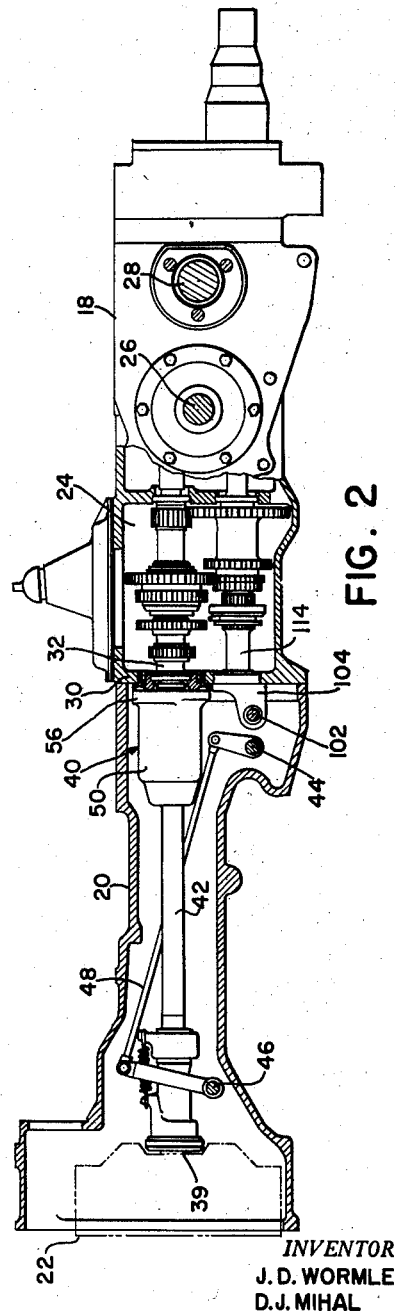
INVENTORS
J. D. WORMLEY &
D. J. MIHAL

INVENTORS
J. D. WORMLEY &
D. J. MIHAL

May 12, 1959 J. D. WORMLEY ET AL 2,885,900

FORWARD-REVERSE TRANSMISSION

Filed Oct. 15, 1956 3 Sheets-Sheet 3

INVENTORS
J. D. WORMLEY &
D. J. MIHAL

United States Patent Office 2,885,900
Patented May 12, 1959

2,885,900

FORWARD-REVERSE TRANSMISSION

James D. Wormley and Dan J. Mihal, Dubuque, Iowa, assignors, by mesne assignments, to Deere & Company, a corporation of Delaware Application October 15, 1956, Serial No. 615,791

11 Claims. (Cl. 74—377)

This invention relates to power-transmitting mechanism especially adapted for automotive vehicles. More particularly, the invention relates to an auxiliary transmission unit capable of use with a standard change-speed transmission for producing in such transmission a number of reverse speeds equal to the number of forward speeds originally designed into the main transmission.

A transmission arrangement of the character described above finds particular utility in the automotive vehicle field in which the automotive vehicle is used in situations in which it is desirable to achieve the same speeds in forward and in reverse, as in earth moving and similar operations. It will be appreciated that a vehicle having only a standard transmission, for example four speeds forward and one reverse, normally has its gear ratios so arranged that the single reverse speed does not provide the same rate in reverse as any of the forward speeds do in forward travel. As a general proposition, it is known to provide, either directly in the transmission or as auxiliary units, reversing means which may accomplish the purposes generally outlined here; that is, the achievement of the same number of speeds in reverse as the transmission provides in forward. In the main, this is accomplished by utilizing reverse idlers appropriately associated with clutch means so that the engine shaft, for example, is optionally connectible directly to the transmission shaft through the reverse idlers. In a typical four-speed transmission having four speeds forward and one in reverse, such auxiliary transmission will provide the main transmission with five speeds forward and five in reverse, since when the main transmission is set in reverse and the auxiliary transmission is set in reverse, an additional forward speed is provided.

It is a principal object of the present invention to provide an improved auxiliary direction-reversing transmission that is compact in construction and design, utilizes relatively few gears, most of which are in constant mesh, and an arrangement that adapts itself for installation in vehicles of presently existing types. It is a further object of the invention to utilize as the reverse idlers, a pair of relatively wide pinions that are in constant mesh with each other and each of which has an adjacent portion in constant mesh with another gear in the auxiliary unit. Further objects reside in the special design of the unit for attachment to existing vehicles, improved control means for the clutch mechanism of the auxiliary unit, and such other features as are inherent in and encompassed by the invention as will appear from the accompanying disclosure of a preferred embodiment thereof.

In the drawings:

Fig. 1 is a small-scale view of a typical agricultural tractor embodying the auxiliary transmission.

Fig. 2 is a longitudinal section through the main body of the tractor, showing the relationship between the auxiliary and main transmissions.

Fig. 7 is a transverse section as seen along the line 7—7 of Fig. 4.

Figures 3, 4:
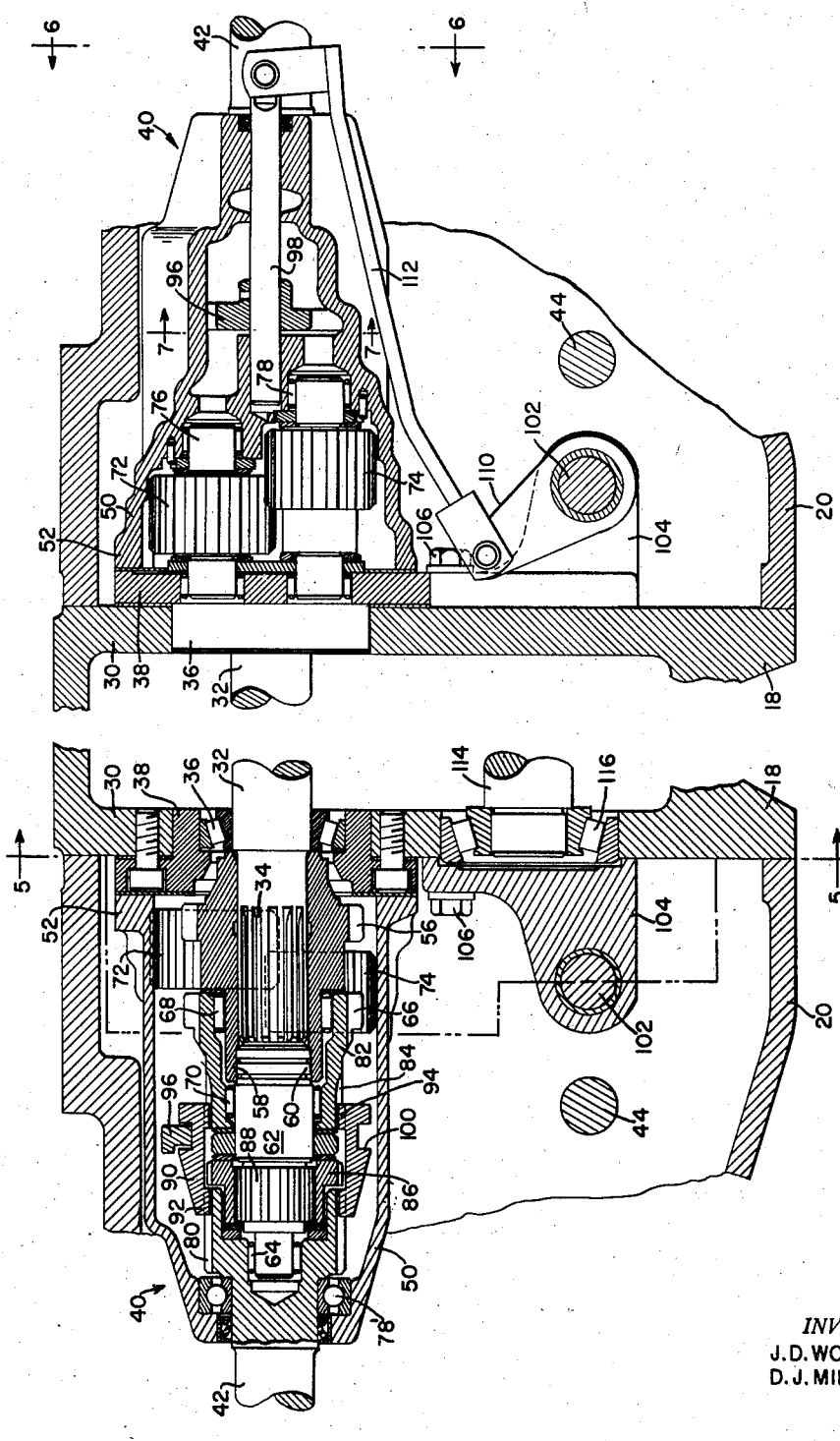
Fig. 3 is a fragmentary sectional view, on an enlarged scale, taken through the auxiliary transmission, as seen from one side thereof.
Fig. 4 is a similar sectional view as seen from the opposite side of the unit.

The vehicle chosen for purposes of illustration is a tractor of a well-known commercial type having a longitudinal body 10 carried on steerable front wheels 12 and rear traction wheels 14, only one of each of which appears in the drawing. The body 10 is made up of a forwardly disposed power plant, here an internal combustion engine 16, a rear main casing 18, and an intermediate hollow or generally tubular interconnecting structure 20. The forward part of this structure accommodates a typical engine clutch, such as indicated schematically at 22 in Fig. 2.

The forward portion of the main casing 18 contains a selective-sliding-gear change-speed main transmission 24, the details of which are relatively unimportant. For present purposes, the transmission 24 may be considered as typical of a conventional four-speed transmission having four speeds forward and one in reverse. The output side of this transmission is connected in any suitable manner to the traction wheels 14, intermediate shafting being illustrated at 26 and 28.

The main case 18 includes, just ahead of the main transmission 24, a transverse wall 30 which journals the transmission input shaft 32. This shaft projects forwardly through the wall 30 to a splined front end 34, the purpose of which will presently appear. Journalling of the shaft 32 in the wall 30 is accomplished in any typical manner by a bearing 36 which is retained by a flanged cap 38.

The power plant shaft, which is driven through the clutch 22, is illustrated at 39 (Fig. 2) and, in a conventional vehicle, this shaft will be connected directly to the transmission input shaft 32. However, according to the present invention, an auxiliary forward-reverse transmission unit 40 is interposed between the shafts 32 and 39, and an intermediate shaft or propeller shaft 42 serves to connect the clutch-driven shaft 39 with the forward-reverse drive mechanism in the unit 40. Stated otherwise, without the auxiliary unit 40 the main transmission 24 functions conventionally; that is, it produces a number of speeds forward and only a single speed in reverse for which it is designed. On the other hand, when the vehicle is equipped with the unit 40, the forward speeds of the transmission 24 are capable of being used as reverse speeds, and the reverse speed of the transmission is capable of being used as another forward speed. For example, in the case of a four-speed-forward and one-speed-reverse transmission, the auxiliary unit 40 produces in the transmission five forward and five reverse speeds.

The engine clutch 22 is conventionally controlled, as via a pair of rockshafts 44 and 46 which respectively have arms linked together by an operating link 48. Whether or not the vehicle is equipped with the auxiliary transmission unit 40, engagement and disengagement of the engine clutch 22 will, of course, connect and disconnect the power train to the main transmission 24 and hence to the rear traction wheels 14.

Figure 5:
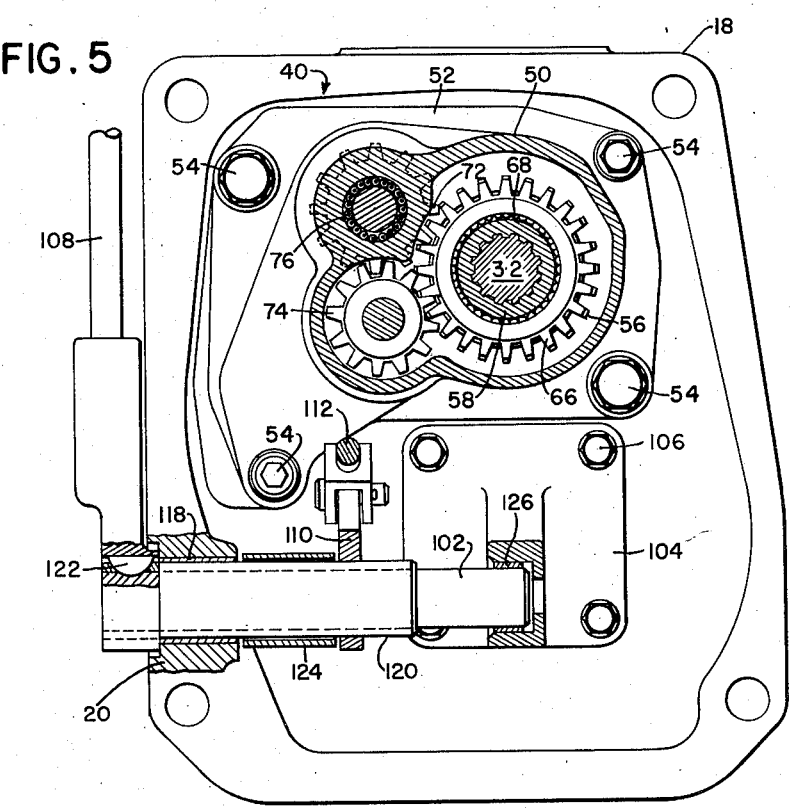
Fig. 5 is a transverse section as seen generally along the staggered line 5—5 of Fig. 3.
Figure 6:
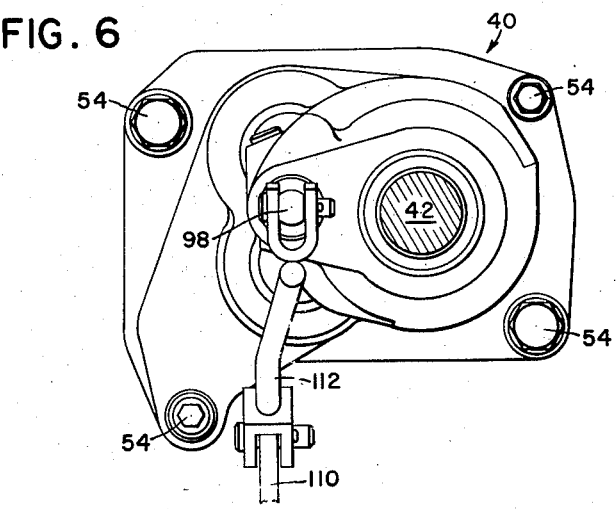
Fig. 6 is a rear view as indicated by the line 6—6 on Fig. 4.

It is a feature of the invention that the unit 40 is compactly designed and comprises relatively few gears and pinions. Moreover, the unit is designed especially for mounting on the forward wall 30 of the main casing 18 so as to be contained within a rearward part of the tubular intermediate structure 20. To this end, the unit 40 includes a housing 50 having at its rear end a marginal flange 52 by means of which it is affixed to the main casing front wall 30 over the bearing cap or retainer 38. Figs. 5 and 6 illustrate a plurality of cap screws 54 as part of the securing means.

The transmission input shaft 32, inasmuch as it projects forwardly to its splined front end 34, is utilized as a first shaft contained within the unit housing 50, and this shaft carries thereon a first gear 56 which has an internally splined elongated hub 58 for axially receiving the shaft 32. Hence, assuming that the gear 56 and other components to be presently described are contained within the unit housing 50, it will be seen that the housing will be accepted by the front wall 30 and the splined end 34 will be simultaneously received by the internally splined hub 58 of the gear 56. The hub 58 has rigidly secured thereto, preferably by silver soldering at 60, a first shaft extension 62 which has its terminal end portion piloted, as at 64, in the proximate end of the propeller shaft 42, which serves as a second shaft in the auxiliary unit 40. Hence, the shaft 42 and the combination shaft 62—34 are coaxially journaled for relative rotation at times. At other times, they are adapted to be directly interconnected for establishing direct or forward drive to the transmission 24.

A second gear 66 is coaxially disposed relative to the first gear 56 and is journaled in part, as by bearings 68, on the hub 58 of the gear 56, and is journaled in part, as by bearings 70, on the shaft extension 62.

The arrangement between the gears 56 and 66 is such that they are axially spaced apart and accordingly are adapted to mesh respectively with first and second constant mesh pinions 72 and 74 which are appropriately journaled, as at 76 and 78, respectively, in additional portions of the housing 50 (Fig. 4). The constant mesh arrangement between the pinions 72 and 74 and each of the pinions with its respective gears 56 and 66 is a significant feature of the invention. It should be noted that each of the pinions is relatively wide and that the pinions axially overlap each other as well as axially overlapping the gears 56 and 66. Stated otherwise, the pinions 72 and 74 have portions in constant mesh substantially in radial register with the axial space between the two gears 56 and 66, and these pinions respectively have additional portions axially offset to opposite sides of the constant mesh portions, which offset portions are in mesh with the gears. In short, the gear 56 is in mesh with the pinion 72, the pinion 72 is in mesh with the pinion 74, and the pinion 74 is in mesh with the gear 66. Thus, by the use of four gears, or two gears and two pinions, a novel and entirely satisfactory reversing gear arrangement is accomplished in a minimum of both axial and radial space. The relative gear ratios are such that the speed of rotation of the shaft 32 is the same in either direction.

That portion of the rear end of the propeller shaft 42 which is enclosed by and journaled in the housing 50 of the unit 40 (as by a bearing 78') is enlarged and formed as a toothed or dental portion or element 80. The gear 66 has a hub 82 which has its forward or terminal end portion formed as a toothed or dental element 84, complementing the dental element 80. Interposed between the elements 80 and 84 is an intermediate or third dental portion or element 86, fixed to or rotatable with the first shaft extension 62, as by a splined connection 88.

The three elements 80, 84 and 86 constitute part of selective clutch means for connecting the shaft 42 directly to the shaft 32 or indirectly and reversely to the shaft 32 via the gearing 66—74—72. The remainder of the clutch mechanism includes an internally toothed or dental clutch sleeve 90 which is in constant mesh at 92 with the dental element 80 and which is selectively meshable at 94 with either the dental element 84 on the gear 66 or the dental element 86 on the shaft 62—32. The clutch sleeve 90 is slidably carried by the dental element 80 and is therefore constantly driven thereby and is positionable in a reverse position, as shown in Fig. 3, to bridge the dental element 86 and to establish a driving connection between the elements 80 and 84, whereby the shaft 42 is coupled to the gear 66 which in turn drives the gear 56 on the shaft 32 in a reverse direction because of the pinions 72 and 74. The clutch sleeve is optionally shiftable to a direct drive position, to the left of that shown in Fig. 3, in which the driving connection at 92 remains connected to the element 80 and the driving portion at 94 is connected to the dental element 86 on the shaft extension 62, whereby the shaft 32 is driven in the same direction as the shaft 42. An intermediate or neutral position is available, intermediate the forward and reverse positions or just to the left of the position shown in Fig. 3.

The clutch sleeve 90 is selectively shifted by control means including a shifting fork 96 carried by a shifting rod 98 and fitting an annular groove 100 in the sleeve. Any appropriate detent means, not shown, may be used to retain the three positions of the shifter rod 98, according to whether the sleeve is in its forward, neutral or reverse positions.

The shifter rod 98 is readily controlled externally of the tractor body by means of an operating rockshaft 102 journaled on a support 104 removably affixed, as by cap screws 106, to the front wall 30 of the main casing 18. The end of the rockshaft 102 that extends externally of the tubular housing or structure 20 has keyed thereto an upstanding control lever 108, which is convenient to the operator's station on the tractor. The inner end of the rockshaft 102 has fixed thereto an upright arm 110 which is connected by a link 112 to the front end of the shifter rod 98.

Some of the details of the mounting of the rockshaft 102 are significant. For example, the main transmission 24 includes a second shaft 114, in addition to the input shaft 32, and this shaft is journaled in a bearing 116 in the forward wall 30. The support 104 serves, in addition to a support, as a cap or retainer for the bearing 116, as best shown in Fig. 3.

The portion of the intermediate tubular housing 20 through which the rockshaft 102 extends has a suitable opening and bearing 118 therein to receive the shaft 102. This shaft is preferably constructed of a central solid portion surrounded by a tubular outer portion 120, but both the solid portion and the tubular portion are keyed at 122 to the external operating shaft 108. A spacer 124 is interposed between the bearing at 118 and the inner operating arm 110. The tube 120 facilitates mounting of the rockshaft 102, since normally the support 104 will be attached to the front wall 30 of the main casing 18 before the casing and tubular housing 20 are bolted together. In this manner, the tubular part 120 of the rockshaft 102 can be already mounted in the wall of the housing 20 and the arm 110 can be connected to the link 112. Then, after the parts are brought into their proper positions, the rockshaft 102 can be inserted through the tube 120 and into the bearing 126 in the support 104. This is a detail that is peculiar to the type of tractor for which the reversing unit was especially designed.

Features and advantages of the invention, other than those categorically enumerated, will undoubtedly occur to those versed in the art, as will many modifications and alterations in the preferred embodiments selected for purposes of disclosure, all of which may be achieved without departure from the spirit and scope of the invention.

What is claimed is:

1. In a vehicle having a longitudinal body including a power plant, a main casing spaced longitudinally from and having a transverse wall facing the power plant, longitudinal intermediate structure extending between the power plant and casing and having wall means defining a compartment separated from the casing by the transverse wall, and a main change-speed transmission housed in the casing and including an input shaft projecting through the wall and toward the power plant and into the compartment, the improvement residing in an auxiliary forward-reverse transmission interposed between the power plant and the main transmission comprising: a housing detachably secured to the casing wall within the compartment and substantially in coaxiality with and enclosing the input shaft and extending partly toward the power plant; rotatable driving and driven members carried in the housing and drivingly connected respectively to the power plant and input shaft; forward-reverse drive mechanism in the housing and selectively settable to interconnect the driving and driven members to drive the latter from the former in either a forward or a reverse direction; and control means for selectively setting the forward-reverse drive mechanism, and including an operating member at least partly traversing the compartment but outside the housing and carried in part by the casing wall and in part by the wall means of the intermediate structure.

2. In a vehicle having a longitudinal body including a power plant, a main casing spaced longitudinally from and having a transverse wall facing the power plant, longitudinal intermediate structure extending between the power plant and casing and having wall means defining a compartment separated from the casing by the transverse wall, and a main change-speed transmission housed in the casing and including an input shaft projecting through the wall and toward the power plant and into the compartment and a second shaft having a journal in the casing wall, the improvement residing in an auxiliary forward-reverse transmission interposed between the power plant and the main transmission, comprising: a housing detachably secured to the casing wall within the compartment and substantially in coaxiality with and enclosing the input shaft and extending partly toward the power plant; rotatable driving and driven members carried in the housing and drivingly connected respectively to the power plant and input shaft; forward-reverse drive mechanism selectively settable to interconnect the driving and driven members to drive the latter from the former in either a forward or a reverse direction; a support secured to the casing wall within the compartment and retaining the aforesaid second shaft journal; an operating member carried in part by the support and in part by the wall means of the intermediate structure; and means connecting the operating member to and for selectively setting the forward-reverse mechanism.

3. The invention defined in claim 2, in which: the operating member is a transverse rockshaft rockably supported in said support and the wall means of the intermediate structure, said wall means having an opening therethrough through which said rockshaft projects.

4. In a vehicle having a longitudinal body including a power plant, a main casing spaced longitudinally from and having a transverse wall facing the power plant, longitudinal generally tubular intermediate structure extending between the power plant and casing, and a main change-speed transmission housed in the casing and including an input shaft projecting through the wall and toward the power plant, and a second shaft offset from the input shaft in a direction transverse to the length of the tubular intermediate structure and having a journal in the casing wall, the improvement residing in an auxiliary forward-reverse transmission interposed between the power plant and the main transmission, comprising: a housing enclosed in the tubular intermediate structure and detachably secured to the casing wall substantially in coaxiality with and enclosing the input shaft and extending partly toward the power plant, said housing having a relatively narrow transverse dimension so as to lie in transversely offset relation to the journal of the second shaft in said wall; rotatable driving and driven members carried in the housing and drivingly connected respectively to the power plant and input shaft; forward-reverse drive mechanism selectively settable to interconnect the driving and driven members to drive the latter from the former in either a forward or a reverse direction; a support secured to the casing wall within the tubular structure and transversely offset from the housing and overlying and retaining the aforesaid second shaft journal; an operating member carried in part by the support and in part by the tubular structure; and means connecting the operating member to and for selectively setting the forward-reverse mechanism.

5. In a vehicle having a longitudinal body including a power plant, a main casing spaced longitudinally from and having a transverse wall facing the power plant, tubular intermediate structure extending between the power plant and casing, and a main change-speed transmission housed in the casing and including an input shaft projecting through the wall into the intermediate structure and toward the power plant, the improvement residing in an auxiliary forward-reverse transmission interposed between the power plant and the main transmission, comprising: a housing enclosed in the tubular intermediate structure and detachably secured to the casing wall substantially in coaxiality with and enclosing the input shaft and extending partly toward the power plant, said housing having a relatively narrow transverse dimension so as to occupy only a portion of the transverse area of the tubular intermediate structure transversely offset from the longitudinal centerline of said structure whereby to afford a space at the other side of said centerline; rotatable driving and driven members carried in the housing and drivingly connected respectively to the power plant and input shaft; forward-reverse drive mechanism selectively settable to interconnect the driving and driven members to drive the latter from the former in either a forward or a reverse direction; and control means for selectively setting the forward-reverse drive mechanism and including a part disposed in the aforesaid space.

6. The invention defined in claim 1, in which: the forward-reverse drive mechanism comprises a first gear fixed to the driven member; a second gear closely coaxially spaced from said first gear and journaled relative to the members; a first relatively wide pinion journaled on the housing and having a portion thereof in constant mesh with the first gear and an adjacent portion axially overlapping the space between said gears; a second relatively wide pinion journaled on the housing and having a portion thereof in constant mesh with the second gear and an adjacent portion axially overlapping the space between said gears and in constant mesh with the adjacent portion of the first pinion; and clutch means axially beyond the gears and pinions and selectively engageable to connect the driving member optionally to either the driven member or to the second gear.

7. A forward-reverse transmission, comprising: a support; a first shaft journaled on the support and having a terminal end portion; a first gear fixed to said shaft and having a hub sleeve rigidly secured to and projecting axially therefrom beyond said first shaft terminal end portion; a first shaft extension coaxially received in and connected to said sleeve and projecting therefrom to an end portion remote from said first gear; a dental clutch element coaxially fixed to said end portion; a second gear journaled in part on said sleeve and in part on said first shaft extension in closely axially spaced relation to the first gear and having thereon a coaxial dental clutch element axially adjacent to the clutch element on said first shaft extension; a first relatively wide pinion journaled on the support and having a portion thereof in constant mesh with the first gear and an adjacent portion axially overlapping the space between said gears; a second relatively wide pinion journaled on the support and having a portion thereof in constant mesh with the second gear and an adjacent portion axially overlapping the space between said gears and in constant mesh with the adjacent portion of the first pinion; a second shaft journaled in the support coaxially with the first shaft extension at said end portion of said extension and having coaxially thereon a dental clutch element at the side of the first shaft extension clutch element opposite from the second gear clutch element; and a dental clutch sleeve encircling and axially astride the three clutch elements and constantly driven by and axially slidable on the second shaft clutch element and having an internal clutch portion selectively engageable with either of the other two clutch elements.

8. The invention defined in claim 7, in which: the first shaft extension clutch element and the second gear clutch element are axially spaced apart to afford an annular space for receiving the internal clutch portion of the clutch sleeve in an intermediate position thereof in which said internal portion is out of engagement with both of said first shaft extension and second gear elements.

9. A forward-reverse transmission, comprising: an elongated housing having first and second opposite ends and of relatively small dimension transverse to its length; a first shaft journaled in the housing at the first end thereof and projecting into the housing lengthwise thereof; a second shaft journaled in the second end of the housing and projecting into the housing in coaxial proximity to the first shaft; a first gear fixed to the first shaft within the housing and closely adjacent to said first end of the housing; a second gear journaled on the first shaft and closely spaced axially therefrom toward the second end of the housing; a first relatively wide pinion journaled in the housing and having a first portion in constant mesh with the first gear and a second portion axially overlapping the space between the first and second gears, a second relatively wide pinion journaled in the housing and having a first portion in constant mesh with the second gear and a second portion axially overlapping said space and in constant mesh with the second portion of the first pinion; clutch means coaxial with the shafts adjacent to the second end of the housing for selectively connecting the second shaft to either the first shaft or second gear; and operating means for the clutch means, including an operating member extending into and lengthwise of the housing at the second end thereof and connected to the clutch means.

10. A forward-reverse transmission, comprising a support; a first shaft journaled on the support; a first gear fixed to said shaft and having a coaxial hub sleeve; a second gear closely coaxially spaced from said first gear and journaled on said sleeve; a first relatively wide pinion journaled on the support and having a portion thereof in constant mesh with the first gear and an adjacent portion axially overlapping the space between said gears; a second relatively wide pinion journaled on the support and having a portion thereof in constant mesh with the second gear and an adjacent portion axially overlapping the space between said gears and in constant mesh with the adjacent portion of the first pinion; a second shaft journaled in the support for rotation at times relative to the first shaft; and clutch means axially beyond the gears and pinions and selectively engageable to connect the second shaft optionally to either the first shaft or to the second gear.

11. A forward-reverse transmission, comprising: a support; a first shaft journaled on the support; a first gear fixed to said shaft; a second gear closely coaxially spaced from said first gear and journaled relative to said shaft; a first relatively wide pinion journaled on the support and having a portion thereof in constant mesh with the first gear and an adjacent portion axially overlapping the space between said gears; a second relatively wide pinion journaled on the support and having a portion thereof in constant mesh with the second gear and an adjacent portion axially overlapping the space between said gears and in constant mesh with the adjacent portion of the first pinion; a second shaft coaxial with the first shaft and said shafts having their proximate ends interjournaled; and clutch means axially beyond the gears and pinions and selectively engageable to connect the second shaft optionally to either the first shaft or to the second gear, said clutch means including axially adjacent dental portions respectively on the second shaft, the first shaft and the second gear, and an axially slidable dental clutch sleeve carried and constantly driven by the second shaft dental portion and shiftable into mesh with either the first shaft dental portion or the second gear dental portion.

References Cited in the file of this patent

UNITED STATES PATENTS

| | | |
|---|---|---|
| 1,839,991 | Petrelli | Jan. 5, 1932 |
| 2,343,733 | Backus | Mar. 7, 1944 |
| 2,507,733 | Mott | May 16, 1950 |
| 2,521,729 | Keese | Sept. 12, 1950 |

FOREIGN PATENTS

| | | |
|---|---|---|
| 736,521 | Great Britain | Sept. 7, 1955 |
| 874,991 | Germany | Apr. 30, 1953 |